F. BEEMER.
ROLLER BEARING.
APPLICATION FILED MAR. 6, 1911.
1,149,889. Patented Aug. 10, 1915.
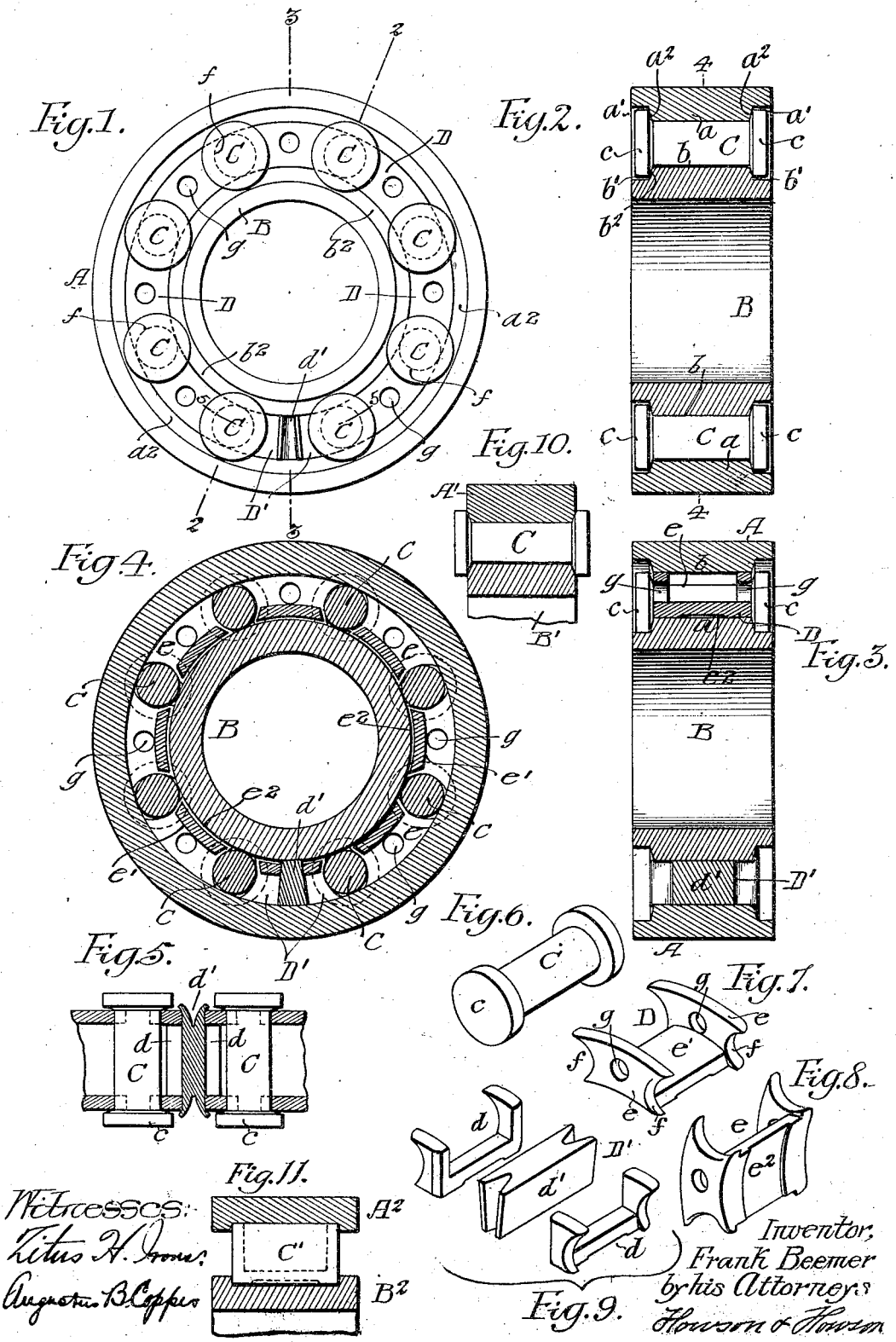
Witnesses:
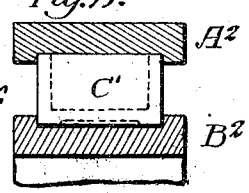
Inventor,
Frank Beemer
by his Attorneys
Howson & Howson

UNITED STATES PATENT OFFICE.

FRANK BEEMER, OF PHILADELPHIA, PENNSYLVANIA.

ROLLER-BEARING.

1,149,889.

Specification of Letters Patent. Patented Aug. 10, 1915.

Application filed March 6, 1911. Serial No. 612,520.

*To all whom it may concern:*

Be it known that I, FRANK BEEMER, a citizen of the United States, residing in Philadelphia, Pennsylvania, have invented certain Improvements in Roller-Bearings, of which the following is a specification.

The main object of my invention is to improve the construction of roller bearings of the type in which the rollers are spaced apart and mounted between two annular raceways, whereby the friction is reduced.

A further object of the invention is to so construct the bearing that the parts can be readily removed if repairs are necessary.

In the accompanying drawing, Figure 1, is a side view of my improved roller bearing; Fig. 2, is a sectional view on the line 2—2, Fig. 1; Fig. 3, is a view on the line 3—3, Fig. 1; Fig. 4, is a sectional view on the line 4—4, Fig. 2; Fig. 5, is a sectional view on the line 5—5, Fig. 1; Fig. 6, is a perspective view of one of the rollers; Figs. 7 and 8, are perspective views of one of the cage segments; Fig. 9, is a perspective view of a three-part cage segment; and Figs. 10, and 11, are views of modifications.

A is an outer ring and B an inner ring, forming the raceways for the rollers C. These rings, in the present instance, have bearing surfaces $a$ and $b$. In each side of the ring A is an annular recess $a'$ and in each side of the ring B is an annular recess $b'$, the heads $c$ of the rollers C travel in these recesses. This construction is preferably employed when thrust blocks are used, or where the bearing is to fit in close contact with another element, but if the bearing is entirely free laterally then the rings may be constructed as in Fig. 10, in which the rings $A'$ and $B'$ are of a width equal to the bearing surface of the roller and the heads of the roller extend beyond the edges of the rings $A'$ and $B'$.

The inner surfaces of the heads are beveled to correspond to the beveled edges of the rings so as to provide a neat fit between the rollers and the two rings. The heads hold the elements in a fixed position laterally yet allow the parts to freely rotate, one in respect to the other. The rollers C are spaced apart, as indicated in Fig. 1, and mounted between the rollers are segments D; the several segments forming the cage which carries the rollers.

At one point I use a three-part segment $D'$, illustrated in Fig. 9; the two elements $d, d$ being shaped to fit the rollers, while the element $d'$ is in the form of a wedge in cross section and is mounted between the two elements $d, d$. Each end of this central element is forked and these forked portions are turned over on the edges of the elements $d$, firmly locking the several parts in position. When it is necessary to remove the rollers or the segments, the forks of the element $d'$ are drawn together and the element can be removed followed by the other elements $d, d$ and one after another of the segments D can be detached and finally when the rollers are all grouped together on one side of the ring B they can be removed.

The segments D are in skeleton form and have side members $e, e$ which bear upon the rollers, and a cross member $e'$ which is free from the rollers. The base of this cross member is cut away at $e^2$ so as to provide the least bearing possible for the segment upon the ring B. The bearing surfaces which rest against the rollers are slightly rounded and they are of an arc slightly greater than that of the rollers, so that the rollers practically bear only at the center of the segments, as clearly shown in Fig. 4.

The side members $e$ are perforated at $g$ so that lubricant can gain access to the interior of the segments; the segments acting as reservoirs for the lubricant, keeping the bearing always in proper condition.

In Fig. 11, I have illustrated a modification in which a series of plane rollers C without heads is used and the raceways $A^2$ and $B^2$ have flanges which overlap the ends of the roller, preventing longitudinal movement of the rollers. These flanges also prevent the segments from moving laterally.

It will be seen by the above construction that I make a roller bearing in which the inner and outer raceways are integral, and in which the rollers are provided with integral heads. The rollers are separated by segments which form the cage, keeping the rollers an even distance apart. I also provide a ready means of dismantling the roller bearing when repairs are necessary, and in order to take up wear on the several segments I may remove the locking section $d'$ of the segment $D'$ and substitute therefor one of greater width, or use a filling piece, if necessary. One advantage of this construction is that any one can prepare a substitute for the piece $d'$ and this piece can be inserted without having to send the roller bearing to the factory for adjustment. Should one of the rollers break or crack under strain, the bearing can be quickly dismantled and another roller substituted for the broken one.

I claim:—

1. The combination in a roller bearing, of a series of rollers; an inner and an outer raceway for the rollers; with a series of independent segments alternating with the rollers, each segment being in skeleton form and having narrow side members which bear upon the rollers and an integral cross member which is free of the rollers.

2. The combination in a roller bearing, of inner and outer raceways; a series of rollers; and a series of spacing segments alternating with the rollers, each roller having a head at each end and the segments each made in a single piece and having narrow side bearing portions and a connecting cross member, the said cross member being cut away so as to reduce its bearing upon the inner raceway.

3. The combination in an inner and an outer ring having elevating raceways spaced a given distance apart; rollers located between the raceways, each of said rollers having a head at each end arranged clear of the raceways, said heads holding the rollers in alinement; with independent skeleton segments alternating with the rollers and having side members bearing upon the rollers at points directly back of the heads; and an integral cross member extending from one side member to the other and free of the rollers.

4. The combination of a series of headed rollers; inner and outer rings; each ring having a raceway between which the rollers are mounted; each ring having an annular groove at each side of the raceway to receive the heads of the rollers; with a series of segments less in width than the rollers; said segments spacing the rollers apart; each segment consisting of two side members which bear against the rollers near each head; and a cross member connecting the side members; one of said segments being made in three parts; two of said parts resting against the rollers and the third part being forked at each end so that on spreading the forked portions apart the several segments and rollers will be locked between the raceways.

In testimony whereof, I have signed my name to this specification, in the presence of two subscribing witnesses.

FRANK BEEMER.

Witnesses:
  WM. E. SHUPE,
  WM. A. BARR.

Copies of this patent may be obtained for five cents each, by addressing the "Commissioner of Patents, Washington, D. C."